Jan. 23, 1968  P. DUNCUMB  3,365,574
ELECTRON PROBE MICRO-ANALYSIS WITH SPECIFIC X-RAY
SPECTROMETER STRUCTURE
Filed Feb. 1, 1965  3 Sheets-Sheet 1

United States Patent Office 3,365,574
Patented Jan. 23, 1968

3,365,574
ELECTRON PROBE MICRO-ANALYSIS WITH SPECIFIC X-RAY SPECTROMETER STRUCTURE
Peter Duncumb, Great Shelford, England, assignor to T. I. (Group Services) Limited, Birmingham, England, a British company
Filed Feb. 1, 1965, Ser. No. 429,227
5 Claims. (Cl. 250—49.5)

ABSTRACT OF THE DISCLOSURE

In an electron probe micro-analyzer with an X-ray spectrometer of the focussing crystal type and with a linkage to keep the crystal and the X-ray detector of the spectrometer on the so-called Rowland circle, the linkage comprises radial arms extending from the center of a virtual Rowland circle offset from the real one and the detector and crystal are connected by respective links to the ends of two of these arms, the links being equal in length to the distance by which the virtual source of the X-rays is offset from the real source of X-rays formed by the specimen itself.

---

This invention relates to apparatus for X-ray micro-analysis. In such apparatus a fine pencil-like beam of electrons is caused to fall on a selected area of a specimen and the X-rays that emanate are analysed, the result revealing the chemical constituents present in that area. The analysis of the X-rays can be performed with a proportional counter but greater resolution, i.e., a greater ability to distinguish between elements of closely adjacent atomic numbers, can be obtained with fully focussing X-ray crystal spectrometer. This employs a curved reflecting crystal which receives the X-rays emanating from the specimen and reflects them into a detector. As the crystal is turned to alter the angle of incidence of the X-rays and thereby to alter the wavelength of the X-rays to which it responds, the detector must be kept at the focal line and in practice this means that the source (i.e., the selected area of the specimen), the crystal and the detector must lie on a circle, known as the Rowland circle, the diameter of the circle being equal to the radius of curvature of the reflecting "planes" of the crystal.

In order to alter the wavelength that is to be detected it is usual to maintain the center of the Rowland circle fixed, moving both the crystal and the detector in arcuate paths of different sizes. It has, however, also been proposed to move the crystal along a straight line as it is turned, this line being the path of the incident rays from the source, and then the Rowland circle effectively rolls about the source. Linkages have been proposed that cause the detector to follow the appropriate paths as the crystal is moved linearly towards or away from the specimen. However, space is restricted in the region of the specimen, not only because of the proximity of the specimen to the bulky final electron lens of the beam-forming specimen, but also because of the desirability of incorporating mechanism for controlling the position of the specimen and for exchanging it for other specimens. The problem is further accentuated if the micro-analyser is combined with an electron microscope having an image-forming system involving a bulky electron lens close to the specimen.

According to the invention, therefore, there is now proposed apparatus for X-ray micro-analysis provided with a focussing reflecting crystal spectrometer of which the crystal is movable linearly towards and away from an X-ray source at a specimen mounting point on the electron-optical axis of the apparatus whilst a detector is movable in a path such as to keep the source, the crystal and the detector on the so-called Rowland circle, in which a linkage for keeping these parts on the Rowland circle comprises a set of three arms pivotally connected together at one end of each at the center of a virtual Rowland circle displaced from the real Rowland circle in a direction away from the electron-optical axis of the apparatus, the other end of one arm being pivoted about a fixed axis displaced by a fixed amount from the specimen mounting point and the other two arms having their other ends connected to the crystal and to the detector respectively through links of an effective length equal to that fixed amount, means being provided to keep the links parallel to the line joining the said fixed axis and the specimen mounting point.

In this way we can employ a reliable type of linkage, i.e., one employing radius arms rather than relying on say, cam surfaces or slides, yet our linkage is clear of the immediate area of the specimen and leaves that area free for the lenses and the specimen-supporting stage with its accompanying control mechanism. Furthermore, the center of the real Rowland circle which is generally close to, or within, the region which is occupied by components of the lens system of the apparatus, is likewise left free of the spectrometer linkage. The arms are preferably mechanically interconnected in a manner such as to keep the angle between the first mentioned arm and the arm that is associated with the crystal equal to the angle between the latter arm and the third arm.

The invention will now be further described by way of example with reference to the accompanying drawings, in which.

Figure 1:
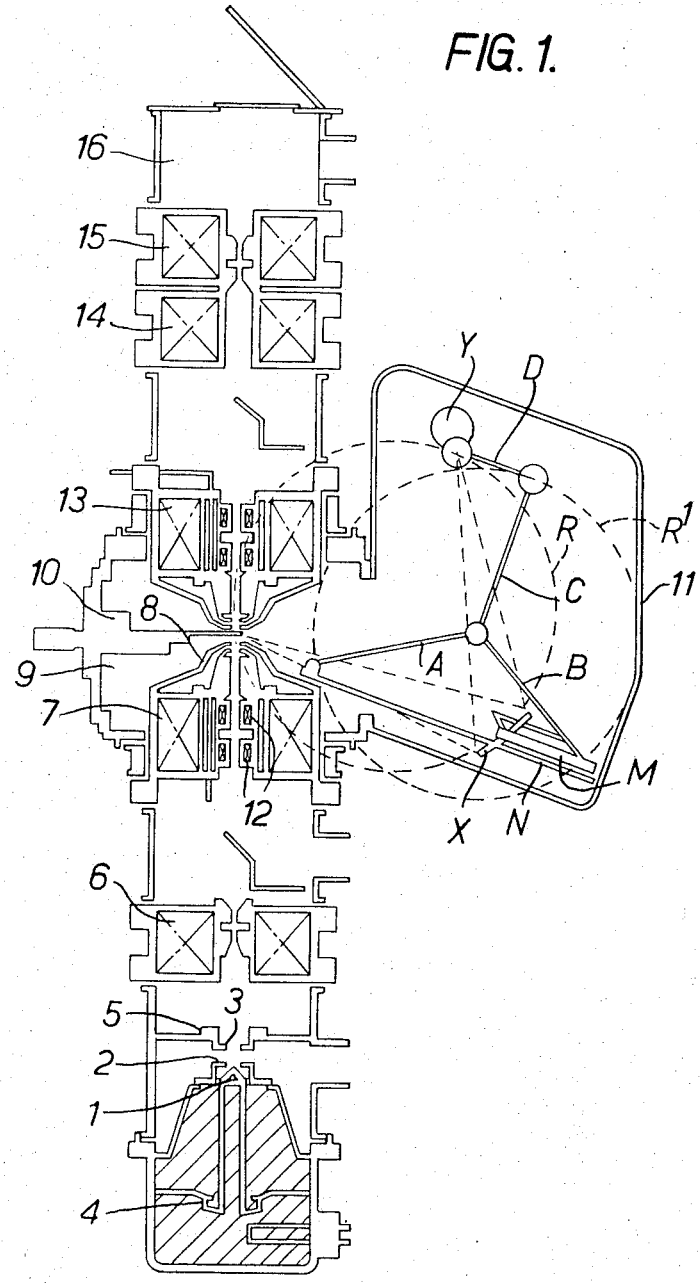
FIGURE 1 is a somewhat simplified diagrammatic vertical section through a combined electron microscope and micro-analyser with a spectrometer to which the invention is applied.

Referring first to FIGURE 1 the apparatus has its axis vertical and has an electron gun at its lower end. It virtually forms a vertically disposed electron-optical bench in which the various lenses and other components are carried in separate short cylindrical or polygonal sections mounted one above another and secured together in a gas-tight manner. The sections are connected to a separate vertical vacuum manifold (not shown) by lateral branch connections at intervals.

Above the electron gun, shown at 1, there is a grid 2 and an anode 3. The position of the filament of the electron gun with respect to the grid can be adjusted and one of two shafts projecting through the side wall of the apparatus for this manual adjustment is shown diagrammatically at 4. The position of the anode 3 in relation to the grid 2 can also be adjusted manually by means of a shaft 5.

Above the anode 3 is a condensing lens 6 and this is followed by the objective lens 7 of the beam-forming system. The objective lens is of special construction, the aim of which is to place its upper pole-piece 8 as close as possible to the specimen (thus allowing a short focal length and minimum spherical aberration), and yet to allow the X-rays emanating from the specimen to be picked up by the X-ray analyser alongside the lens. To achieve this the pole-piece 8 is prominently domed, sufficiently to allow it to be within about one centimeter of the specimen and yet allow X-rays to be collected at an angle of up to 20° to the plane of the surface of the specimen.

The objective lens 7 protrudes into a box 9 forming the specimen chamber. The stage on which the specimen is mounted, and by which its position can be controlled from outside the instrument, is shown at 10. It also includes means for bringing any one of a number of different specimens into the electron-optical axis and for introducing specimens into or removing them from the chamber 9 without losing the vacuum within the instrument.

Where the instrument is being used for micro-analysis a selected area of the specimen is bombarded with electrons and the resulting X-rays that emanate from the specimen are analysed by means of a spectrometer having analysing crystal and a proportional counter in a housing 11.

Where the instrument is being used as an electron microscope then a substantial area of the specimen is illuminated by the electron beam, by appropriate control of the focus and aperture of the objective lens 7 or by scanning the beam over the selected area by means of scanning coils 12 contained within the back bore of the lens 7. An image of the illuminated area is formed by an electron-optical system comprising an objective lens 13, which is identical with lens 7 of the beam-forming system, an intermediate lens 14 and a projector lens 15. The image is formed in the usual way in a viewing chamber 16.

Figure 2:
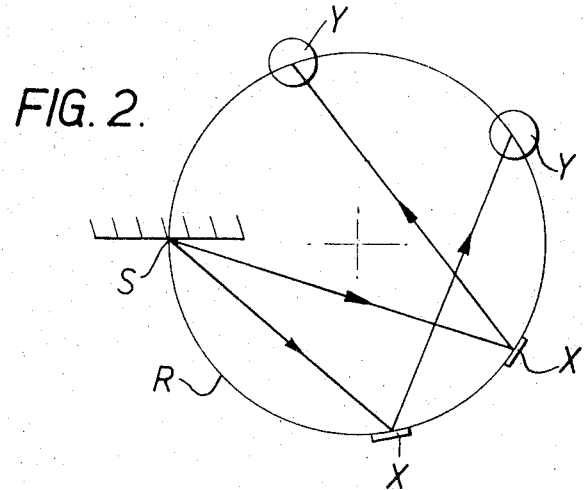
FIGURES 2 and 3 are diagrams used to illustrate the need for the novel method of mounting the crystal and the detector of the spectrometer.
Figure 3:
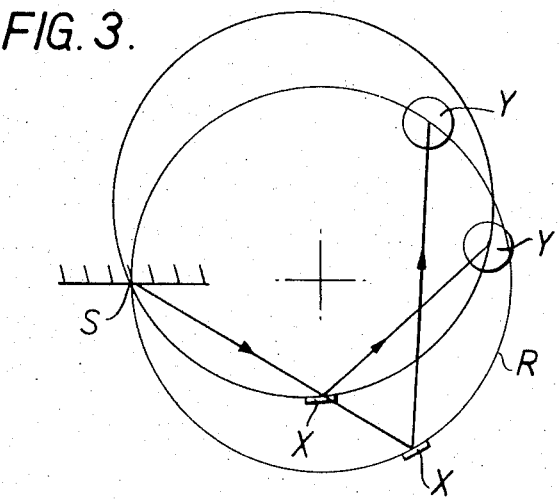

The crystal spectrometer will now be described; to understand the reasons for the form it takes we will first refer to FIGURES 2 and 3. To give the highest efficiency of collection and wavelength resolution the spectrometer should be of the fully focussing type, which means that the X-ray source S (in this case the specimen), the reflecting crystal X and the detector Y must lie on a circle, known as the Rowland circle, and shown at R, the diameter of this circle being equal to the radius of curvature of the reflecting "planes" of the crystal. The center of the circle lies on the normal from the center of the crystal, and the paths of the X-rays from the source and to the detector make equal angles with this normal.

In order to alter the wavelength that is to be detected it is usual to maintain the center of the Rowland circle fixed, moving both the crystal X and the detector Y in arcuate paths of different sizes. FIGURE 2 shows the positions of these for two different Bragg angles. However, as the spectrometer has to be in a vacuum and as other devices have to be accommodated around the specimen chamber, the spectrometer should have as small a volume as possible and we find this result is easier to achieve if we use the geometrical arrangement shown in FIGURE 3, in which the crystal is moved in a straight line towards and away from the specimen, and the center of the Rowland circle itself is moved in an arcuate path around the specimen. Although more complicated mechanically than the arrangement in FIGURE 2 this so-called linear focussing spectrometer need only occupy a small sector of the space around the specimen. It is desirable that it should form a separate unit which is detachably mounted on the wall of the chamber 9. It must also be small enough to keep the radius of curvature and size of the crystal small and to avoid having a large volume to be evacuated. This means that the crystal must be as close as possible to the specimen at the lowest Bragg angle (shortest wavelength) and the crystal must therefore actually pass within the chamber 9 itself. This in turn makes for some difficulty in arranging the mechanical linkages between the source, crystal and detector because the close proximity of the two objective lenses 7 and 13 and of other devices makes it impossible to position a mechanical bearing or bearings having an axis either passing through the specimen or at the center of the Rowland circle.

To overcome these difficulties we displace the effective Rowland circle from the mechanical point of view radially outwards. Whilst the true Rowland circle, on which the crystal and the detector lie, passes through the specimen, the mechanical linkage defines a circle in a more convenient position.

Figure 5:
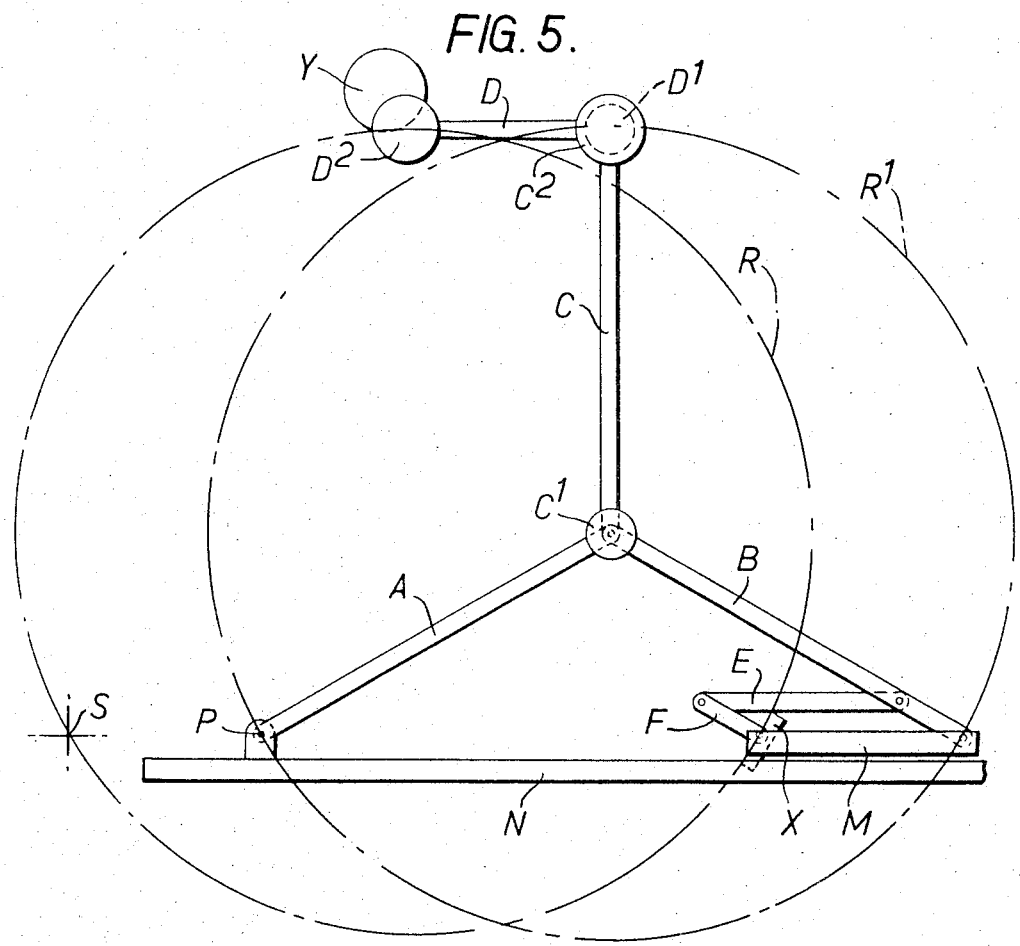
FIGURES 4 and 5 show the crystal and detector mounting in two different positions.
Figure 4:
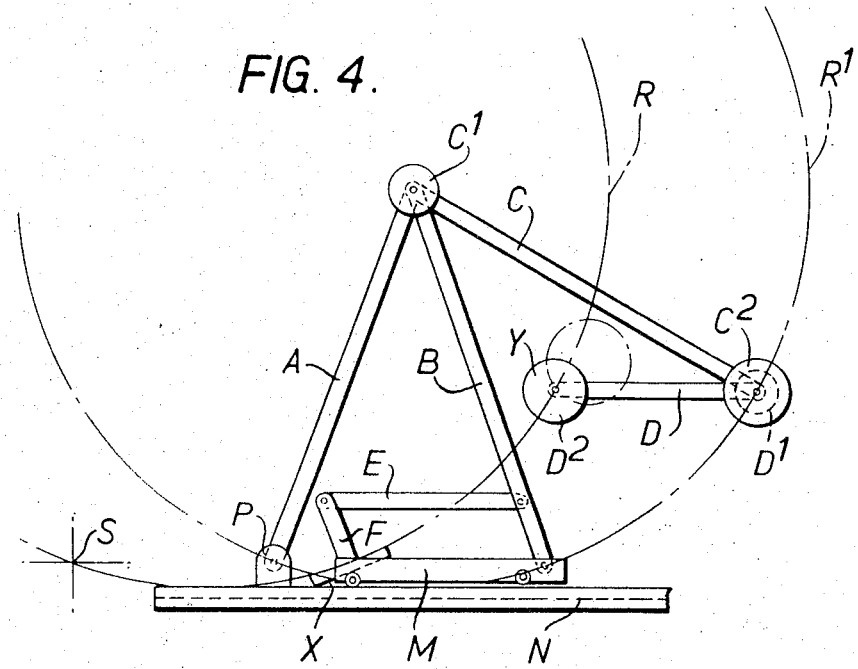

The way this is achieved is shown in FIGURES 4 and 5, which shows the linkage in two positions. In FIGURE 4 it is set for a Bragg angle (angle between the incident beam and the crystal "plane") of 20° and in FIGURE 5 the angle is 60°. In practice a range of 15° to 65° is adequate. The linkage comprises three radius arms A, B and C of equal length, pivoted together at the center of the virtual Rowland circle R'. The outer end of the arm A is pivoted to a fixed point P representing the virtual source. The outer end of the arm B is pivoted to the rear end of a linearly moving carriage M, which is guided for linear movement on a fixed slide N in a direction parallel to the line joining the virtual source P to the real source S (the specimen). The forward end of the carriage M carries the crystal X, the length of the carriage being equal to the spacing between the specimen and the point P. The crystal is pivotally mounted on the carriage and a parallelogram linkage comprising links E and F ensures that the crystal is always kept facing towards the center of the real Rowland circle R.

The detector Y is carried on the end of an arm D which is equal in length to the carriage M and it is arranged that, as the arms A, B and C turn, the arm D is kept parallel to the line of movement of the carriage. At the same time it is arranged that the arm C moves at such a rate that the angle it makes with the arm B is always equal to the angle between the arm A and the arm B. In this way the necessary geometrical conditions are met.

The control of the movement of the arm C can conveniently be achieved by means of spur gears at the pivotal interconnection between the arms A, B and C. For example a spur gear on the axis of the pivot and secured to the arm B can engage a spur gear freely mounted on a pivot on the arm A. This second gear is fast with a third which meshes with a gear on the common pivotal axis but is secured to the arm C. The product of the gear ratio between the first pair and that between the second pair is two, so that a given angular movement of the arm B with respect to the arm A produces just double that movement in the arm C. The spur gears are not illustrated but their disposition and mounting will, it is believed, be readily understood. Other means, such as pivoted links or a system of cords and pulleys could be used to achieve the same result.

The arm D is kept parallel to the direction of travel of the carriage M by means of a pair of pulleys C1 and C2 interconnected by a belt, the pulley C1 being secured to the arm A and the pulley C2 being secured to the arm D. It can easily be shown that the ratio of the diameter of C1 to C2 should be 3:4.

A further pair of pulleys D1 and D2 secured respectively to the arm C and to the detector Y, and having a diameter ratio of 2:3, rotate the detector with respect to the arm D and ensure that the detector is always kept facing towards the crystal X.

The belts interconnecting the pairs of pulleys may be in the form of inextensible metal tapes, keyed to the pulleys, as the total angular movement is limited. Alternatively they may be replaced by sprockets, connected by chains instead of belts.

In practice the arms A, C and D are not single arms but pairs of arms spaced apart, with the crystal carriage and the detector between them. Although FIGURES 4 and 5 show the line of movement of the carriage M horizontal, the linkage is tilted in practice through twenty degrees in a clockwise direction, as shown in FIGURE 1, so that the spectrometer receives X-rays emanating from the specimen at 70° to the electron-optical axis. An incidental advantage of this is that throughout the desired range of movement the weight of the arm C loads the spur gears in the same direction, avoiding any backlash problems.

The movement of the crystal carriage can be controlled by means of a lead-screw (not shown) operable from outside the housing 11. With the carriage M withdrawn from the chamber 9 the crystal X can be exchanged from below, and conveniently there may be two crystals mounted back to back and it is only necessary to turn them over in order to bring a new crystal into action. A total range of wavelengths of 0.9 up to ten Angstrom units can then be covered in a single spectrometer, although a second spectrometer could be accommodated if desired to permit analysis of two elements simultaneously.

I claim:

1. Apparatus for X-ray micro-analysis comprising means for focussing an electron beam on a pre-arranged spot on a specimen and a spectrometer for analysing the X-ray radiation emanating from said spot, said spectrometer comprising first, second and third arms pivoted mutually together at one end of each, said arms being of equal length and lying in a common plane passing substantially through said spot, a pivotal connection between the other end of said first arm and a fixed point which is displaced a substantial finite fixed distance from said spot, a first link connected at one end thereof to the other end of said second arm, X-ray detecting means disposed on the other end of said first link, a second link connected at one end thereof to the other end of said third arm, a reflecting crystal disposed at the other end of said second link, said first and second links each having an effective length equal to said fixed distance, and means maintaining said links parallel to each other and to a line joining said spot and said point whereby said crystal, X-ray detecting means and spot are constrained to lie on a common circle, said first arm being capable of swinging about said fixed point and said second and third arms being capable of swinging about their pivotal connection with said first arm and including means for maintaining the angle between said first and third arms and between said second and third arms equal during said swinging movements.

2. Apparatus as set forth in claim 1 wherein said second link lies on a straight line passing through said spot and said point.

3. Apparatus as set forth in claim 1 including means constraining said crystal to lie on a straight line passing through said spot.

4. Apparatus as set forth in claim 1 including means for keeping said X-ray detecting means facing said crystal.

5. Apparatus as set forth in claim 1 including means for keeping said crystal facing towards the center of said circle.

References Cited
UNITED STATES PATENTS 2,898,469   8/1959   Rose _____ 250—51.5
2,916,621   12/1959  Wittry _____ 250—49.5

WILLIAM F. LINDQUIST, *Primary Examiner.*